United States Patent Office 3,319,940
Patented May 16, 1967

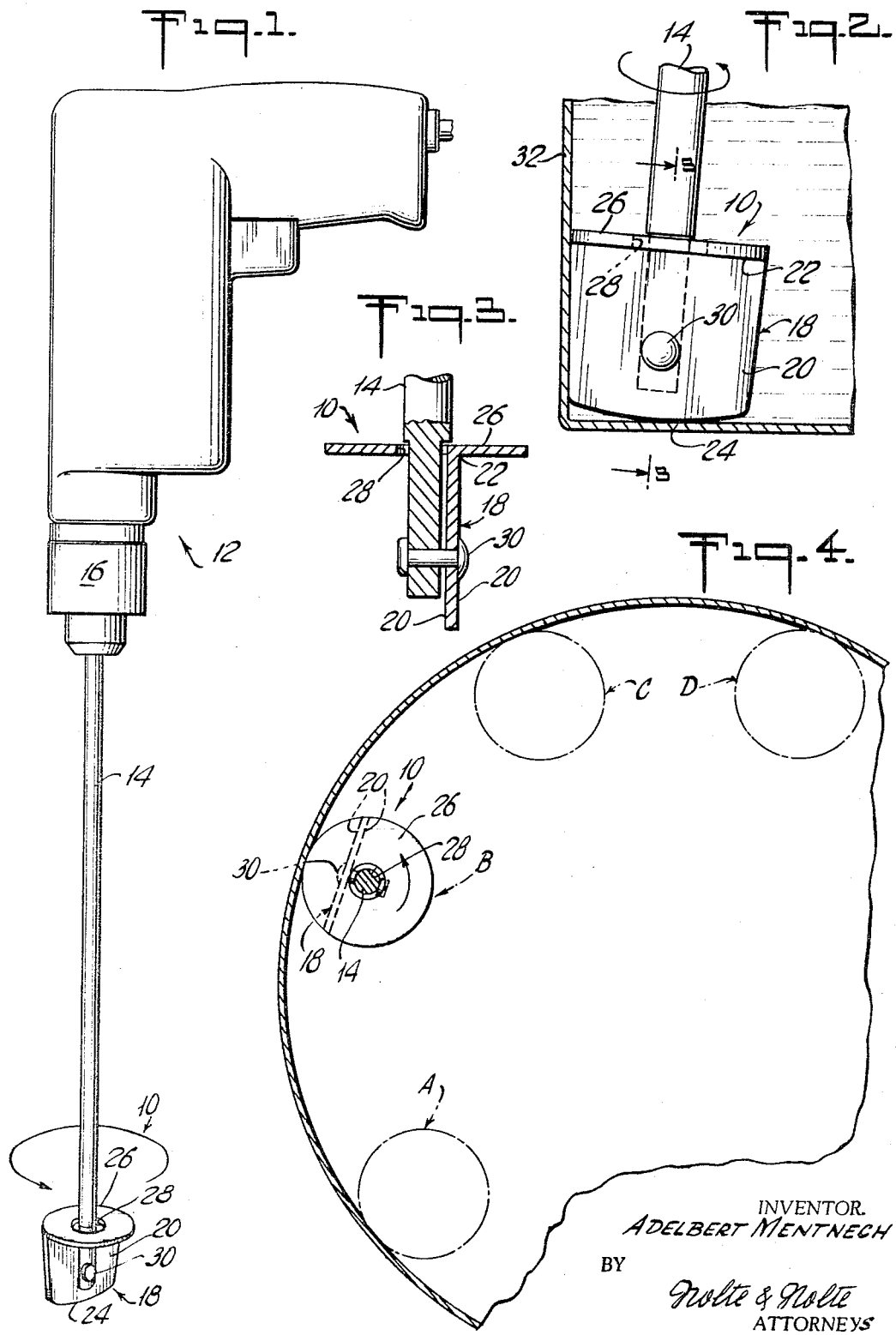

3,319,940
DEVICE FOR STIRRING LIQUIDS
Adelbert Mentnech, Locust Valley, N.Y., assignor of thirty-three and one-third percent to Albert C. Notte, Jr., New York, N.Y., and thirty-three and one-third percent to Clinton G. Bush, Jr., Centre Island, Oyster Bay, N.Y.
Continuation of application Ser. No. 359,334, Apr. 13, 1964. This application Apr. 8, 1966, Ser. No. 541,394
9 Claims. (Cl. 259—138)

This is a continuation of application Ser. No. 359,334, filed Apr. 13, 1964, and now abandoned.

The present invention relates to stirring devices.

More particularly, the present invention relates to devices which are adapted to stir liquids such as paints.

Although devices for this purpose are well known, they suffer, in general, from several drawbacks. Thus, conventional stirring devices of this type cannot avoid undesirable splashing of the liquid which is stirred. Also, the known stirring devices have undesirable impacts with the container in which the liquid is located, and where this container is a relatively thin metal it sometimes happens that the container becomes undesirably deformed by the mixing device during rotation thereof.

It is a primary object of the present invention to provide a stirring device of the above type which will very greatly minimize, and in fact eliminate, splashing of the liquid which is stirred.

Another object of the present invention is to provide a stirring device which will not have undesirable impacts with the wall of a container in which the liquid is located. For example, known stirring devices of cranked configuration will strike undesirably against the wall of the container, and in accordance with the objects of the present invention a stirring device is provided which will not behave in this manner.

Yet another object of the present invention is to provide a stirring device which will stir the liquid with elements which act in different directions in the liquid so as to provide a very thorough stirring thereof.

Furthermore, it is an object of the present invention to provide a stirring device which is of a simple construction and relatively light weight.

In addition, it is an object of the present invention to provide a stirring device which can be easily and thoroughly cleaned.

According to a primary feature of the present invention the stirring device includes a rotary stirring vane which can be substantially flat and which has a pair of opposed side faces and an upper edge, the stirring vane being positioned substantially vertically when it is submerged in a liquid to stir the same. An upper plate is fixed to the upper edge of the stirring vane and projects laterally beyond the opposed side faces thereof, so that this plate which rotates with the stirring vane will greatly minimize any tendency of the liquid to be splashed during the stirring thereof.

The invention is illustrated by way of example in the accompanying drawings which form part of this application and in which:

FIG. 1 illustrates one possible embodiment of a stirring device of the invention shown in FIG. 1 connected to a drive means for rotating the stirring device;

FIG. 2 fragmentarily illustrates the stirring device submerged in a liquid which is to be stirred;

FIG. 3 is a sectional view of the structure of the invention taken along line 3—3 of FIG. 2 in the direction of the arrows; and FIG. 4 is a plan view of the stirring device shown in different positions which it can take within a container for the liquid which is to be stirred.

Referring now to the drawings, the stirring device 10 of the present invention (FIG. 1) is adapted to be connected to a driving means 12 which, for example, may take the form of an electric motor of the type used for relatively small drills. The stirring device 10 includes an elongated straight rod 14 of circular cross-section, for example, and, as is illustrated in FIG. 1, the upper end of the rod 14 can be gripped in a well known manner in the chuck 16 of the drive means 12 so that when the latter operates the rod 14 will be rotated about its axis.

The rod 14 has a lower portion which is adapted to be submerged in the liquid which is to be stirred, as indicated in FIG. 2, and in accordance with the present invention there is located alongside of the lower portion of the rod 14, a rotary stirring vane 18 connected to the rod 14 for rotation therewith in a manner described below. As may be seen from FIG. 3, the vane 18 has a pair of opposed side faces 20 and an upper edge 22. As is apparent from FIGS. 1 and 2, the vane 18 is substantially flat and is symmetrically arranged with respect to the rod 14 and is furthermore situated in a plane which is parallel to the axis of the rod 14. As is apparent from FIG. 2, the vane 18 tapers slightly towards its bottom edge 24 which is convexly curved to a slight extent and which terminates in rounded corners.

An upper plate 26 is fixed to the upper edge 22 of the vane 18 and is flat and located in a plane normal to the plane of the vane 18, and the upper plate 26 is formed with an opening 28 of circular configuration through which the rod 14 extends with substantial clearance. As is apparent particularly from FIG. 4, the plate 26 is of circular configuration, extends along the entire length of the upper edge 22 of the vane 18, and extends laterally beyond the opposed side faces 20 thereof.

A rivet 30, in the illustrated example, forms a pivot means which pivotally connects the vane 18 to the rod 14 for turning movement relative thereto about an axis which is perpendicular to the vane 18 as well as to the axis of the rod 14, and the pivotal movement provided by the pivot means 30 (FIG. 3) is limited by the clearance of the rod 14 in the opening 28. It is to be noted that the vane 18 extends downwardly beyond the bottom end of the rod 14.

When the above-described stirring device of the invention is placed within the container 32 which contains a liquid which is to be stirred, it is to be noted that as the rod 14 rotates and is held in a somewhat inclined attitude, as shown in FIG. 2, the vane 18 will rotate with the rod so as to stir the liquid. However, any splashing of the liquid is reliably prevented by the upper plate 26 which by its location over the vane 18 intercepts any currents which might tend to be transmitted through the liquid up to the surface thereof so as to cause splashing at the surface of the liquid. Nevertheless, the rotation of the vane 18 will provide a thorough stirring of the liquid. Because of the circular configuration of the plate 26, the slightly tapered configuration of the vane 18, and its slightly curved bottom edge 24 is of convex configuration, any contact between the edges of the vane 18, or the plate 26 with a wall of the container 32, will provide only a sliding movement of the rotary vane 18 and plate 26 without any sharp impact which might result in undesirable deformation of the container and certainly cannot result in any piercing of the wall of the container, and when the operator detects rubbing of the vane 18 or plate 26 with the wall of the container the position of the device can be easily adjusted to eliminate such rubbing.

Furthermore, in addition to providing stirring of the liquid due to the rotation of the vane 18, the limited pivotal movement afforded by the pivot means 30 and opening 28, causes the vane and plate assembly 18, 26 to oscillate back and forth, about the axis of the pivot means 30, particularly when the rod 14 is somewhat inclined as shown in FIG. 2, so that the upper plate 26 has an oscillatory motion in the liquid, tilting up and down so as to provide stirring of the liquid not only by rotation of the vane 18 with the rod 14 about the axis of the latter but also by the oscillatory motion of the plate 26.

As may be seen from FIG. 4, it is a simple matter for the operator to displace the device to the various positions such as the positions A, B, C, D, or to any desired position in the container 32 so as to distribute the stirring action throughout the liquid, and this operation is very easy because of the light weight of the stirring device 10. Moreover, this stirring device is of an exceedingly simple construction requiring only the rod 14 and the unitary assembly 18, 26, this rod and assembly being connected to each other by the single rivet 30. These parts 14, 18, 26 and 30 can be made of any suitable metal and not only is the structure of an extremely light weight and quite expensive, but in addition it is extremely easy to clean.

I claim:

1. A device for stirring liquids such as paints, comprising an elongated rod adapted to be rotated about its axis and having a lower portion which is adapted to be placed within a liquid which is to be stirred, a substantially flat rotary stirring vane located alongside of said lower portion of said rod and arranged substantially symmetrically with respect thereto, said vane being located in a plane substantially parallel to the axis of said rod and having a pair of opposed side faces and an upper edge, pivot means pivotally connecting said vane to said rod for pivotal movement about an axis perpendicular to the axis of said rod and perpendicular to the plane in which the said vane is located, and an upper plate fixed to said upper edge of said vane and extending laterally beyond said opposed side faces thereof, said plate being formed with an opening through which said rod passes and said opening of said plate being larger than the cross-sectional area of said rod so that the latter extends with clearance through said opening whereby said opening of said plate provides a limited free pivotal movement of said vane and said plate therewith with respect to said rod.

2. A device as recited in claim 1 and wherein said vane has a slightly tapered configuration.

3. A device as recited in claim 2 and wherein said vane has a convexly curved bottom edge.

4. In a device as recited in claim 3, said plate being perpendicular to said vane.

5. In a device as recited in claim 4, said plate having a circular configuration.

6. A device for stirring liquids such as paints, comprising an elongated straight rod adapted to be rotated about its axis and having a lower portion which is adapted to be placed within a liquid which is to be stirred, a flat rotary stirring vane located alongside of said lower portion of said rod, arranged substantially symmetrically with respect thereto, extending downwardly beyond said lower portion thereof, and having a slightly tapered configuration and slightly rounded bottom edge which is convexly curved, said vane having an upper edge and a pair of opposed side faces, and an upper plate of circular configuration normal to said vane and fixed to and extending along the entire length of said upper edge thereof, said plate extending laterally beyond said opposed side faces of said vane and having a circular configuration, and said plate being formed with an opening through which said rod extends with substantial clearance, and pivot means pivotally connecting said vane to said rod for turning movement relative thereto, within the limits afforded by said opening of said plate, about an axis normal to said vane and the axis of said rod.

7. A device for stirring a liquid comprising an elongated rotatable driving member, a stirring vane, means for pivotally mounting said vane on said member at the lower end portion of said member for pivotal movement only in a plane substantially parallel to the longitudinal axis of said member, said vane having opposing substantially flat faces the side edges of which lie in downwardly sloping rectilinear planes, said vane having a convexly curved bottom edge extending between the sides of said vane, and a disc surrounding said rod above said vane, the periphery of said disc being radially spaced from said rod at least as far as the edges of said vane.

8. A device for stirring liquids such as paint comprising an elongated rotatable driving rod, a substantially flat stirring vane, means for pivotally connecting said vane to the lower end portion of said rod, a cover plate fixed to an upper edge of said vane and extending over the lateral faces of said vane, and means for limiting the pivotal movement of said plate and said vane with respect to said rod including an opening in said plate through which said rod passes with predetermined clearance therebetween.

9. In a stirring device including an elongated rotatable rod, a substantially flat stirring vane, means for pivotally mounting said vane to the lower end of said rod, and a cover plate fixed to the upper edge of said vane, said plate extending beyond the lateral faces of said vane, and means for limiting the pivotal movement of said plate and said vane with respect to said rod including an opening in said plate through which said rod passes with predetermined clearance therebetween.

References Cited by the Examiner

UNITED STATES PATENTS

| | | | |
|---|---|---|---|
| 114,785 | 5/1871 | Finley | 259—134 |
| 1,182,909 | 5/1916 | Holtz | 259—107 |
| 1,753,121 | 4/1930 | Kerr | 259—108 |
| 1,839,082 | 12/1931 | Burgard | 259—108 |
| 2,718,385 | 9/1955 | Greblick et al. | 259—96 X |
| 3,182,970 | 5/1965 | Ivanoff | 259—95 |

WILLIAM I. PRICE, *Primary Examiner.*